Aug. 10, 1926.
R. HEIMERDINGER
MICROMETER INDICATOR
Filed April 2, 1921
1,595,092
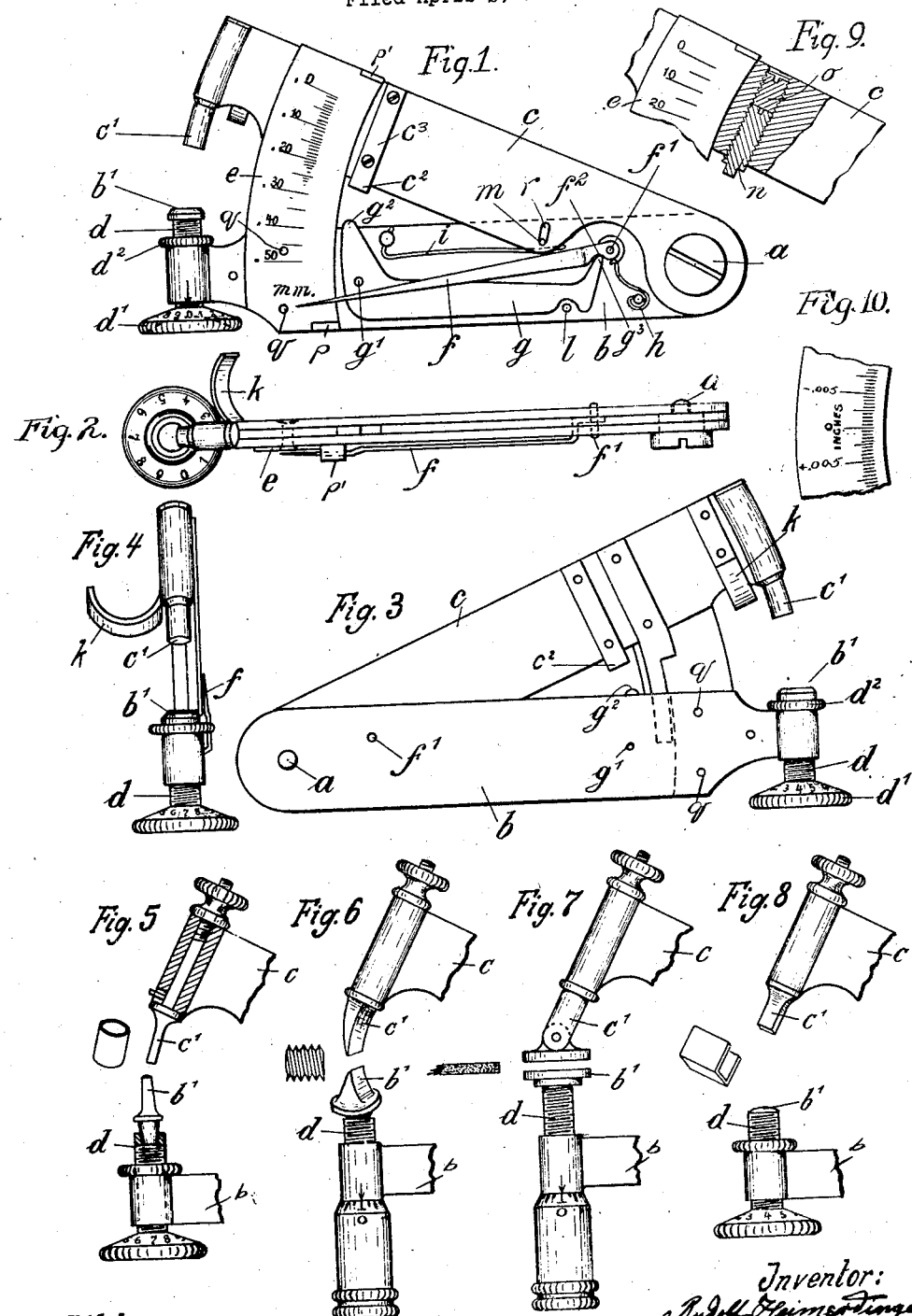

Patented Aug. 10, 1926.

1,595,092

UNITED STATES PATENT OFFICE.

RUDOLF HEIMERDINGER, OF LEIPZIG, GERMANY.

MICROMETER INDICATOR.

Application filed April 2, 1921. Serial No. 458,137.

The invention refers generally to measuring instruments such as micrometer indicators and the main object of my invention is to construct an instrument wherewith if desired dimensions can be taken within a hundredth part of a millimeter or a fraction of one thousandth part of an inch and can be read quickly on an indicator scale attached to the instrument. Original features of my invention consist of a peculiar combination of measuring levers, a transmission lever and an indicator hand and the manner of their suspension and cooperation, whereby new and improved results are produced. Compared with similar measuring instruments, dimensions can be read by means of my micrometer indicator on a more enlarged scale and without vibration of the indicator hand and it has other novel features as for instance means for reading dimensions on an indicator scale within an adjusted range of dimensions and providing clearance space for quick and easy insertion of objects to be measured, particularly of hollow objects, plates of all kinds, sheets, thread, many differently formed articles, paper, etc. It is of greatest advantage for very accurate and quick measuring of a large number of articles of similar sizes.

A construction embodying the principle of my invention is shown in the attached drawings and is hereinafter fully described.

Figure 1, is a front view of the inner mechanism, with front cover detached, Figure 2 is a side elevation. Figure 3 is a back view. Figure 4 is a front elevation. Figures 5, 6, 7 and 8 show various kinds of attachments for measuring different articles. Figure 9 shows details of means of adjustment attached to a measuring lever. Figure 10 shows a scale marked differently as in Figure 1.

Referring specifically to Figure 1 two measuring levers $b$ and $c$ are employed, being pivotally movable in relation towards each other around a centering pin or axis $a$.

A transmission lever $g$ may be pivoted to the measuring lever $b$ on pin $g^1$, and having a short and a long arm. The indicator hand $f$ may be pivoted to the lever $b$ on pin $f^1$.

A spring $h$ may be attached to lever $b$ and to the indicator hand in such manner that the spring is holding the indicator hand in close touch with the transmission lever, which in turn may normally rest on pin 1, the latter being fastened to lever $b$.

The scale $e$ may be attached to lever $b$ by means of rivets $q$, which may penetrate the lever and scale as shown in Figures 1 and 3. The measuring lever $c$, which as stated, is pivoted to measuring lever $b$, may have a lug $c^3$ arranged in such a manner that if the measuring levers are moved towards each other by hand pressure, the lug $c^3$ will press with its surface $c^2$ against the transmission lever $g$ at $g^2$, forcing the latter at $g^3$ against the surface $f^2$ of the indicator hand $f$, causing the free end of the latter to sweep across the scale $e$, which latter may have two end corners $p$ and $p^1$ turned up in order to form stops for the indicator hand if the object to be measured is not within the limited range of the scale.

The lug $c^3$, the transmission lever and the indicator hand, are preferably made of hardened steel, the contact surfaces $c^2$, $g^2$, $g^3$ and $f^2$ preferably being polished.

At the back of measuring lever $c$, a hook $k$ may be attached as shown in Figures 1 to 4, the levers being operated by pulling with the right index-finger on the hook and pressing with the right thumb against the measuring lever $b$.

The object of the adjustable screw $d$ will now be explained. In view of the fact that the indicator hand only shows dimensions within a very limited range, there must be means of adjustment which make it possible to measure within a greater range of dimensions. For this purpose the screw $d$ is provided, which latter may be attached to lever $b$, but which may be attached to either one of the measuring levers. A lock nut $d^2$ may be provided for locking the screw $d$ as shown in Figures 1 to 5. The screw $d$ may be as shown in Figures 1 to 5 or it may be a micrometer screw as shown in Figures 6 and 7. The numbers 0 to 9 shown in Figures 1 to 5 at the bottom of the screw are evenly spaced, and can be used for approximate setting so that the instrument can be set quickly within the range at which the indicator hand comes into action. This is sufficient if only comparative measuring is required. If actual measuring in millimeters or inches is required, a micrometer screw as shown in Figures 6 and 7 should be used, as will later be more fully explained.

Interchangeable measuring blocks $c^1$ and $b^1$ of various shapes may be used as shown in Figures 5 to 8, in order to facilitate measuring differently shaped articles, the latter being shown in Figures 5 to 8.

The measuring block $c^1$ may be arranged interchangeably in the lever $c$ as shown in Figure 5, or it may be soldered to it or be a part thereof. The measuring block $b^1$ may be arranged interchangeably in the adjustable screw $d$ as shown in Figure 5, the lower end of the block $b^1$ being tapered and fitting accurately into a tapered hole within the screw $d$. The measuring surfaces of the blocks $c^1$ and $b^1$ may be arranged as shown in Figure 1, substantially parallel, if a very limited range of measuring is required on the scale. If a larger range is required on the scale and if the measuring surfaces should be parallel, the block $c^1$ may be constructed as shown in Figure 7, the latter block $c^1$, being practically self-aligning to block $b^1$.

A spring $i$ may be provided for normally keeping the measuring levers sufficiently far apart to permit of easy and quick entering of objects between the measuring blocks or measuring surfaces.

The pin $m$ may be screwed or riveted into the lever $b$ and a slot $r$ may be milled into the lever $c$ as shown in Figure 1, in such manner, that the latter can swing freely around its centering pin $a$ within the limit of slot $r$ and pin $m$. If the tension of the spring is in outward direction, the lever $c$ will be pressed outwardly until it gets into the position shown in Figure 1. The spring $i$ may rest within a slot in the lever $c$ as shown by a dotted line in Figure 1.

Instead of a lug $c^3$ being attached to the lever $c$, an adjustable screw $n$ as shown in Figure 9 may be used, the purpose of the screw $n$ being to provide accurate adjustment, as will be explained later on.

If comparative readings only are to be taken, the screw $n$ is not required. Exceedingly accurate comparative readings can be made with the device as shown in Figure 1. If, however, actual measuring is required instead of comparative measuring, a micrometer screw $d$ as shown in Figures 6 and 7 must be used, and in combination therewith the adjustable screw $n$, which latter must be carefully adjusted as will now be explained.

The screw $n$ may be adjusted by screwing up the micrometer screw entirely as shown in Figures 6 and 7, the arrow pointing to zero on the micrometer screw. If the measuring levers are pressed together in this position, with nothing between the surfaces, the screw $n$ must be adjusted in such manner that the free end of the indicator hand points to zero on the scale. Such adjustments may be made from time to time in case of actual measuring, if either the measuring blocks $c^1$ and $b^1$ are exchanged or if wear takes place at the measuring surfaces or at the contact surfaces. In case of comparative measuring, such adjustments are not required, the more so, because the spring $h$ has a tendency to automatically take up wear which may take place, so that the instrument will remain perfectly correct for comparative measuring.

It is immaterial whether the adjustable screw $n$ is attached to the measuring lever $c$ or to the transmission lever, the results being exactly the same.

As shown in Figure 1, the micrometer screw as well as the scale are based on the metric system. The numbers shown on the scale represent hundredth parts of a millimeter the total scale covering 50/100 millimeter, equal to ½ millimeter.

The scale shown in Figure 10 and the micrometer screw used in connection therewith are based on inches, zero being in the center of the scale and plus and minus can be read towards both ends of the scale, each line on the scale representing 1/2000 inch.

It will be seen, that if the measuring levers are moved inwardly or towards each other, the indicator hand swings outwardly, therefore, the numbers on the scale decrease in outward direction as shown in Figure 1.

The thread of the micrometer screw $d$ as shown in Figure 1 may have a rise of ½ millimeter per revolution of thread so that the measuring surfaces may be adjusted exactly ½ millimeter for each turn of the screw. In combination with the range of ½ millimeter shown on the scale, this permits of a complete range, limited only by the length of the indicator screw and the shape and size of the measuring levers. If additional adjustments should be required, the micrometer screw may contain additional lines or divisions as shown in Figures 6 and 7 and as is customary with micrometer screws.

Careful comparisons of similar sized objects are not made by reading the micrometer screw at each reading. The latter is only regulated and set to a certain point in such manner that the measuring levers, the transmission lever and indicator hand may cooperate, thus permitting to compare quickly and accurately by reading on the scale.

The operation is as follows: The micrometer screw is properly adjusted and the instrument is preferably held in the right hand the measuring surfaces being in horizontal position, with measuring levers normally apart. The object to be measured is introduced between the measuring surfaces and the latter are closed by pressure of the index finger on the hook $k$ and of the thumb on the measuring lever $b$ and the dimensions are read on the scale.

The manner in which the instrument is used may be best explained by giving an example.

If the dimension of an article to be measured is known to be approximately 10.20 mm. the micrometer screw may be adjusted to 10 mm. If after the measuring levers are closed on the object, the indicator hand points to 30, the size of the object is 10.30 mm. and if it points to 10 the size of the object is 10.10 mm.

If the scale shown in Figure 10 is used in combination with a micrometer screw which is based on inches, and if an object of approximately .250 inch is to be measured, the micrometer screw is set at .250 inch. If the levers are closed on the object, plus or minus can be read on the scale in 1/2000 inch. By successively inserting similar pieces or objects plus or minus in comparison with a standard piece can be easily and very accurately read on the scale.

The instrument is primarily constructed and intended for taking a large number of comparative measurements where it is not necessary to frequently adjust the micrometer screw $d$ and where the screw $n$ rarely requires adjustment.

The direction in which the pressure is exerted from the measuring lever $c$ towards the transmission lever, in my construction, forms a sharp angle with line $g^2$, $g^1$ thus forcing the contact surfaces $g^2$ to slide peripherally on contact surface $c^2$ for a distance several times as great as the radial swing of $c^2$, thereby multiplying the angular motion of the transmission lever $c$ and causing friction between the lever $c$ and the transmission lever which friction increases in direct proportion to the hand pressure exerted on the measuring lever $c$, causing a steady motion of the transmission lever, no matter whether much or little pressure is exerted or whether the pressure of the lever $c$ on the transmission lever is exerted quickly or slowly. As the result of this feature, the motion imparted to the indicator hand is steady and entirely free from vibrations. The sliding friction which takes place between the contact surfaces, at the same time entirely prevents vibrations of the transmission lever and of the indicator hand even at quick operation. This peculiar action permits the operator to instantly take readings on a very much enlarged scale, without straining the eyes.

The angles which the sliding contact surfaces $c^2$ or $g^2$ form with lines passing through $c^2$ or $g^2$ and the axes of the measuring levers may be changed, provided, however, that the angle being formed between the connecting line of the points $g^2$ and $g^1$ and the line of direction in which pressure is exerted on the transmission lever by lever $c$ is being changed simultaneously. The transmission lever may have arms of different relative proportions, the arms may form a different angle towards each other than shown or the transmission lever may be suspended on one end forming practically one single arm instead of two arms as shown. I reserve the right for making such changes which do not alter the principle of my invention but which may be desirable for different services and either for ordinary or very fine measurements and scale readings. In my construction as shown in attached drawings, the free end of the indicator hand moves about one hundred times as fast as the measuring block $c^1$ of the measuring lever $c$, while measuring. As a result the motion of the measuring surface is shown on the scale about one hundred times enlarged. It will be seen from Figure 1 that in its normal position the measuring lever $c$ is completely detached from the transmission lever and the indicator hand. Measuring starts when the contact surface $c^2$ of the measuring lever $c$ gets in touch with the contact surface $g^2$ of the short arm of the transmission lever, its long arm operating the indicator hand. It will therefore be understood that before readings can be taken the micrometer screw must first be adjusted in such manner that the surface $c^2$ and $g^2$ get in touch before the measuring surfaces touch the object to be measured.

In the present design the measuring surfaces are normally kept apart by means of the spring $i$ and they are closed by hand pressure. It is obvious this procedure may be reversed, but this is not shown in the drawings because various similar designs are known and this feature may therefore be applied by a mechanic by comparison with existing designs. In the specifications is explained why slidable contact surfaces between the axially movable measuring lever and transmission lever and between the latter and the indicator hand are preferable. Broadly I do not limit myself to this particular feature of my invention.

In order to understand the principle of my invention it must be clearly understood that the measuring levers are practically always in the same relative measuring positions, their relative measuring positions varying usually only a fraction of a thousandth part of an inch or at most a few thousandths part of an inch, all greater adjustments being made by the screw $d$. It is therefore immaterial to what lever the scale is attached.

Broadly speaking the scale must be held in a fixed relation to any one of the levers. The scale may be marked in an empirical way after the instrument is assembled.

Similarly it matters little to what lever the indicator hand is pivoted, provided the scale is marked in an empirical way.

In known similar instruments the scale is attached to the indicator hand and an arrow is shown on a lever, which constitutes a reversal of the elements and which therefore need not be shown separately.

In explaining more fully the advantages of my invention and its original features, I may say, that none of the present devices is adapted for quick and very accurate measurements, as compared with my device. The feature which adapts it for quick readings, is the use of an indicator device which is free from vibrations, and wherein the hand steadily moves to the correct point of the scale, thus permitting instant readings. The device also permits of easy and quick insertion of articles, the measuring points normally being far apart. Very accurate readings can be taken, because the indicator hand in my design may show variations in dimensions a hundred times increased, if desired, on account of the peculiar combination of measuring levers, transmission lever and indicator hand and on account of the manner in which the spring $h$ acts on the indicator hand and transmission lever, permitting no dead clearance between them and between lever $c$. The adjustable screw $n$ permits of accurate and quick adjustments of the indicator device in case of wear or in case tips are exchanged in order to measure articles of different shapes.

Actual and not only comparative very accurate measurements may be taken with my device over a wide range, because a micrometer screw may be used in combination with my device. This feature of employing a micrometer screw in combination with a very sensitive reliable indicator device, as shown herein, and wherein variations in sizes may be read easily, very many times enlarged, is a novel improvement.

Since the axis of the micrometer screw is vertical to its measuring surface, the two measuring surfaces may be arranged to be parallel over the entire range of adjustment of the micrometer screw.

The use of the adjustable screw $n$ in combination with the micrometer screw is novel and is of value for careful adjustments for actual accurate measuring, the known indicator devices being adapted for comparative measuring only while my device may be used, if desired, for accurate actual measuring as well as for accurate comparative measuring, without employing master gages or samples.

As a result of the peculiar transmission lever used, the dimensions may be read a hundred times enlarged, the design being such, that light or strong hand pressure on the measuring levers show the same readings within a fraction of a thousandth of an inch, provided hard objects are measured.

The construction of my micrometer indicator can be considerably modified as will be readily understood.

I claim:

1. A micrometer indicator, consisting of two measuring levers pivoted together and being provided with measuring surfaces, a transmission lever pivotally connected with one of said measuring levers and being operated by the other one of said measuring levers, a scale being in fixed relation to one of said measuring levers, an indicator hand being pivotally mounted on the one of said measuring levers and operated by said transmission lever, said indicator hand cooperating with said scale while said measuring levers are in measuring position, means being provided on one of said levers for adjusting the angular motion of said transmission lever and of the indicator hand in such manner, that the indicator hand may point to a predetermined point on the scale, while said measuring surfaces are a specified distance apart from each other.

2. A micrometer indicator, consisting of two measuring levers pivoted together and being provided with measuring surfaces, a transmission lever pivotally connected with one of said measuring levers and being operated by the other one of said measuring levers, a scale being in fixed relation to one of said measuring levers, an indicator hand being pivotally mounted on the one of said measuring levers and operated by said transmission lever, said indicator hand cooperating with said scale while said measuring levers are in measuring position, and an adjustable screw or plug $n$ being provided on the one of said measuring levers which operates said transmission lever, substantially as and for the purpose set forth and explained.

3. A micrometer indicator, consisting of two measuring levers pivoted together and being provided with measuring surfaces, a transmission lever pivotally connected with one of said measuring levers and being operated by the other one of said measuring levers, a scale being in fixed relation to one of said measuring levers, an indicator hand being pivotally mounted on the one of said measuring levers and operated by said transmission lever, said indicator hand cooperating with said scale while said measuring levers are in measuring position, a spring being provided for keeping said measuring levers apart while not measuring and a stop for limiting their outward motion.

4. A micrometer indicator, consisting of two measuring levers pivoted together and being provided with measuring surfaces, a transmission lever pivotally connected with one of said measuring levers, said transmission lever having a long and short arm, the latter arm being operated by the other one of said measuring levers, a scale being in fixed relation to one of said measuring levers, an indicator hand being pivotally mounted on the one of said measuring levers and operated by said long arm of said transmission lever, said indicator hand cooperating with said scale while said measuring levers are in measuring position.

5. A micrometer indicator, consisting of two measuring levers pivoted together and being provided with measuring surfaces, a transmission lever pivotally connected with one of said measuring levers and being operated by the other one of the said measuring levers, a scale being in fixed relation to one of said measuring levers, an indicator hand being pivotally mounted on one of the said measuring levers and being operated by said transmission lever, a spring $h$ pressing against said indicator hand and being so arranged that a close contact is thereby being maintained between said indicator hand and said transmission lever and between the latter and the said measuring lever which operates the said transmission lever while measuring, said indicator hand cooperating with said scale while said measuring levers are in measuring position.

6. A micrometer indicator, consisting of two measuring levers pivoted together and being provided with measuring surfaces, a transmission lever pivotally connected with one of said measuring levers, said transmission lever having a long and short arm, said latter arm being operated by the other one of said measuring levers, a scale being in fixed relation to one of said measuring levers, an indicator hand being pivotally mounted on one of the said measuring levers and operated by said long arm of said transmission lever, a spring $h$ being so arranged that it presses against said indicator hand in opposite direction in which said indicator hand is forced to move by said transmission lever, said indicator hand cooperating with said scale while said measuring levers are in measuring position.

In witness whereof I have hereunto set my hand.

RUDOLF HEIMERDINGER.